M. MILCH.
ALTERNATING CURRENT MOTOR.
APPLICATION FILED DEC. 23, 1903.
918,690.
Patented Apr. 20, 1909.
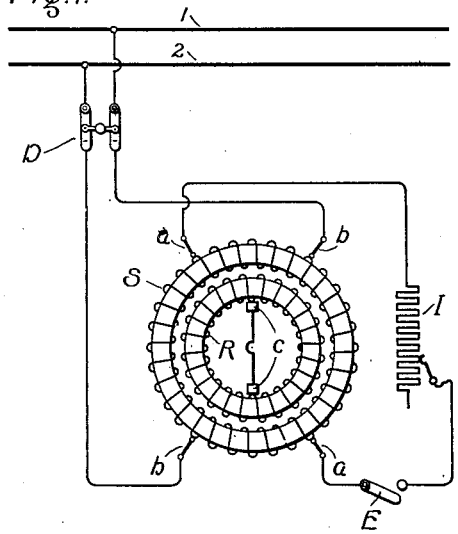
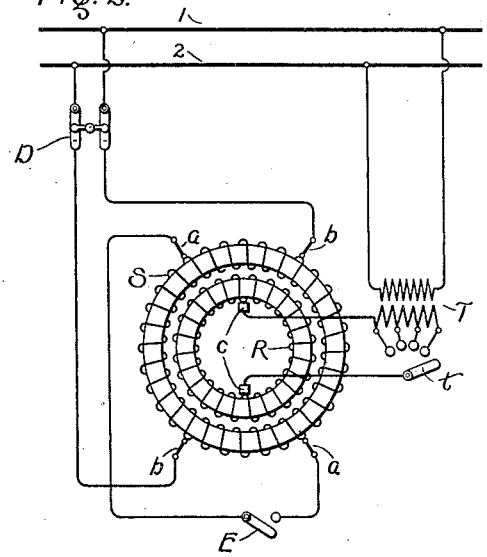
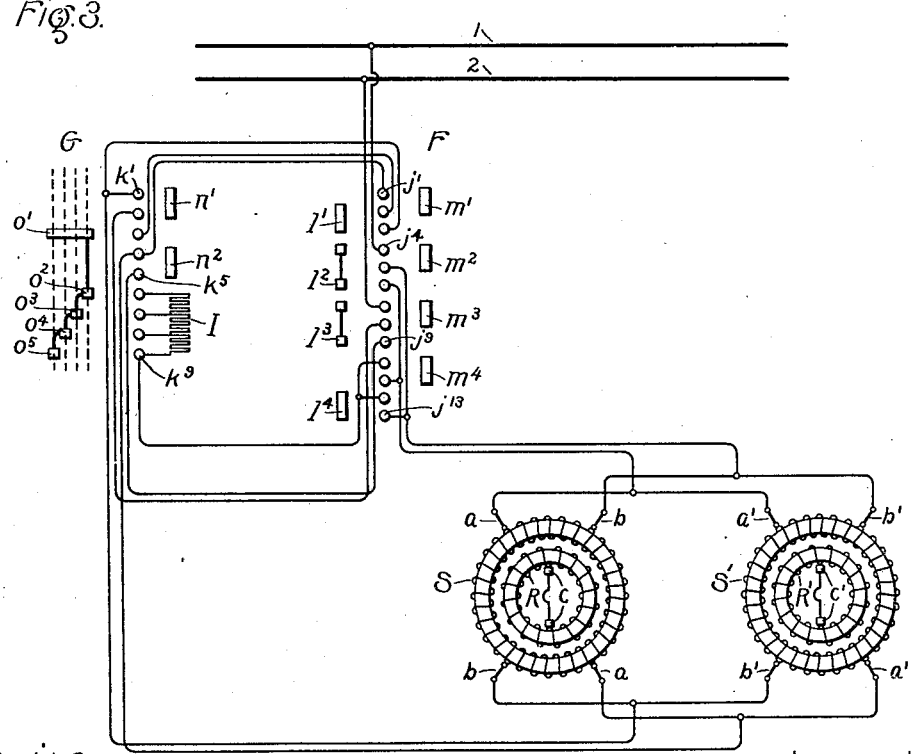
Witnesses.
J. Ellis Glew.
Helen Orford.
Inventor.
Maurice Milch.
By Albert G. Davis
Atty.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

ALTERNATING-CURRENT MOTOR.

No. 918,690.      Specification of Letters Patent.      Patented April 20, 1909.

Application filed December 23, 1903. Serial No. 186,363.

*To all whom it may concern:*

Be it known that I, MAURICE MILCH, a subject of the King of Hungary, residing at Schenectady, in the county of Schenectady and State of New York, have invented certain new and useful Improvements in Alternating-Current Motors, of which the following is a specification.

My invention relates to the control of alternating-current motors of the repulsion type, and its object is to provide simple, efficient and reliable means for so controlling such motors as to produce a strong braking effect upon a car or other body driven by motors of this type.

The direction of rotation of a repulsion motor depends upon the relative positions of the line of magnetization of the primary member and the commutator brushes of the secondary member. The direction of rotation can consequently be reversed by shifting the position of either the line of magnetization or the brushes. A simple method of reversing the motor consists in providing two sets of terminals, one set on each side of the brush position, and connecting one set or the other to the source of current according to the direction of rotation desired. A motor thus provided with two sets of terminals might be braked by shifting the connection of the source from one set of terminals to the other. This method of braking, however, would be impractical, since it would not only draw an extremely large current from the line, but the shock upon the motor and the body driven thereby would be excessive. I have discovered, however, that by taking advantage of the residual magnetism of the motor a strong braking effect may be obtained which is not too violent and which may readily be controlled in amount.

My invention will be best understood by reference to the accompanying drawings, in which—

Figures 1 and 2 are diagrams explanatory of my invention, and Fig. 3 shows an arrangement of switches and circuits embodying my invention.

Referring first to Fig. 1, S represents the stator of a repulsion motor having two sets of terminals $a\ a$ and $b\ b$. R represents the rotor of the motor having the ordinary short-circuiting brushes $c$ disposed midway between the two sets of stator terminals. In the figure, terminals $b\ b$ are shown connected to the mains 1 2 through the switch D. The motor will consequently revolve in a counter-clockwise direction according to the well known repulsion principle. Now if switch D is opened, disconnecting terminals $b\ b$ from the line, and if switch E is closed, short-circuiting the other set of terminals $a\ a$, the residual magnetism of the motor will cause a current to flow in the motor winding which will react upon the short-circuited stator winding and upon the magnetism of the motor in such a manner that the magnetism and the currents in both short-circuited members will be increased. The effect is cumulative and large currents will be almost instantaneously produced, resulting in a strong braking action. In practice this cumulative effect is too sudden, producing too severe a shock upon the motor and the car if both primary and secondary windings are directly short-circuited. In order to reduce the shock a variable impedance may be inserted in the circuit of either member. Thus, I have shown in Fig. 1 the primary or stator terminals $a\ a$ short-circuited through the variable resistance I. By short-circuiting the primary member through the whole of this resistance at first and then gradually reducing the amount of resistance included in the short-circuit as the motors slow down the braking effect may be readily controlled.

As has been said, the variable impedance may be inserted in the short-circuit of either the primary or secondary member, and the current flow in both short-circuits will be controlled thereby in either case. Furthermore, instead of the variable resistance I of Fig. 1, other forms of variable impedance may be used. Thus, in Fig. 2 I have shown a source of back-electromotive force as variable impedance connected in the short-circuit of the secondary member. The transformer T has taps from its secondary winding led out to switch contacts adapted to be engaged by the switch member $t$ which is connected in circuit with the brushes $c\ c$ of the secondary member R. The flow of current in the short-circuits may be controlled by this means, and furthermore instead of dissipating the energy developed in heat, as in the arrangement of Fig. 1, the energy is returned to the line by the arrangement shown in Fig. 2.

Referring now to Fig. 3, an arrangement of switches is shown adapted to the control of one or more motors in such a manner as to operate them in either direction and to produce a braking action when desired while they are rotating in either direction. The switches consist of the reversing-switch F and the main controlling-switch G. The reversing-switch F consists of the stationary contacts $j^1\ j^2$ etc., and two sets of movable contacts $l^1\ l^2$, etc. and $m^1\ m^2$ etc., the sets of movable contacts corresponding to the forward and reverse rotation of the motors. The controlling-switch G comprises the stationary contact-fingers $k^1\ k^2$, etc., and the two sets of movable contacts $n^1\ n^2$ and $o^1\ o^2$, etc. $n^1\ n^2$ are the running contacts and $o^1\ o^2$ etc., are the braking contacts. Thus, if reversing-switch F is moved so that the contacts $l^1\ l^2$, etc., are in engagement with the stationary contacts, and switch G is moved so that the running contacts $n^1\ n^2$ are in engagement with the stationary contacts, the motor-circuits are as follows: from line wire 1 to contact-finger $j^4$, to movable contact $l^2$, to stationary contact-finger $j^6$, to upper terminals $a\ a'$ of the motors through stator windings S and S' in parallel, to lower terminals $a\ a'$, to stationary contact-finger $k^4$, movable contact $n^2$, stationary contact $k^5$, to stationary contact $j^9$, movable contact $l^3$, stationary contact $j^7$ to line wire 2. If switch G should be moved to its other position the stator circuits from the terminals $a\ a'$ would be opened at contact-fingers $k^4$ and $k^5$. A new circuit is established, however, as follows: from upper stator terminals $b$ and $b'$ to contact-finger $j^{13}$, movable contact $l^4$, contact-finger $j^{12}$, contact-finger $k^9$ through resistance I, contact-finger $k^6$, movable contact $o^2$, movable contact $o^1$, contact-finger $k^3$, contact-finger $j^2$, movable contact $l^1$, contact-finger $j^3$, to lower terminals $b$ and $b'$. The terminals $b\ b$ and $b'\ b'$ of the motors are consequently short-circuited through the resistance I. As switch G is moved through its other braking positions, resistance I is gradually cut out, until in the last position of switch G the stator terminals are directly short-circuited. It will be seen that if switch F is moved to its opposite position and the movable contacts $m'\ m^2$ etc. are in engagement with the stationary contact-fingers, the direction of rotation of the motors will be reversed, and the braking effect for that direction of rotation will be obtained by the same movement of switch G. This will be evident from the drawing, and it will be unnecessary to describe the circuits in detail here.

In order to avoid complicating the drawings, switch G has been shown without arrangements for shifting the motors from series to parallel or other similar speed-controlling arrangements. It will be understood, however, that additional running contacts may be provided if desired, and connected in any of the ways well known in the art without departing from my invention. Furthermore, as has been already explained, the variable resistance may be introduced in the short-circuit of the secondary member or other forms of variable impedances may be used. Other changes in the arrangement of the controlling devices for the motor may be introduced without departing from the spirit of my invention. For instance, since the braking effect depends solely upon the relative direction of displacement of the commutator brushes and the primary terminals, any well known form of brush-shifting device may be used to obtain the relative reversal of the displacement instead of employing the means for shifting the terminal connections with the primary member.

I do not desire to limit myself to the particular construction and arrangement of parts here shown, since changes therein which do not depart from the spirit of my invention and which are in the scope of the appended claims, will be obvious to those skilled in the art.

What I claim as new and desire to secure by Letters Patent of the United States, is,

1. In combination, a repulsion motor having two sets of terminals for forward and reverse rotation respectively, a source of alternating current, means for connecting one set of terminals to said source, and means for disconnecting said set from the source and for connecting the other set in short-circuit.

2. In combination, a repulsion motor having two sets of terminals for forward and reverse rotation respectively, a source of alternating current, and a switch adapted to connect one set of terminals to said source and to disconnect said set from said source and to connect the second set in short-circuit.

3. In combination, a repulsion motor having two sets of terminals for forward and reverse rotation respectively, a source of alternating current, means for connecting and disconnecting one set of terminals to and from said source, means for short-circuiting the other set, and means for controlling the amount of current flow in the short-circuit.

4. In combination, a repulsion motor having two sets of terminals for forward and reverse rotation respectively, a source of alternating current, a switch adapted to connect and disconnect one set of terminals to and from said source and to connect the other set in short-circuit, and means for controlling the amount of current flow in the short-circuit.

5. In combination, a repulsion motor having two sets of terminals for forward and reverse rotation respectively, a source of alternating current, means for connecting and disconnecting one set of terminals to and from said source, and means for short-circuiting the other set through a variable impedance.

6. In combination, a repulsion motor having two sets of terminals on its primary member for forward and reverse rotation respectively, a source of alternating current, means for connecting one set of terminals to said source and short-circuiting the secondary member of the motor, and means for disconnecting said set of terminals from the source, short-circuiting the other set, and inserting a variable impedance in the circuit of the secondary member.

7. In combination, a repulsion motor having two sets of terminals for forward and reverse rotation respectively, a source of alternating current, means for connecting one set of terminals to said source, means for disconnecting said set from said source and for connecting the other set in short-circuit, and means for returning the energy thereby generated to said source.

8. In combination, an alternating-current motor having a primary member and a secondary member provided with a commutator and short-circuiting brushes, a source of alternating current, means for connecting said source to said primary member to produce a magnetization thereof on a line displaced from the line of said brushes, and means for disconnecting said primary member from said source and short-circuiting said primary member on a line displaced in the other direction from the line of said brushes.

9. In combination, an alternating-current motor having a primary member and a secondary member provided with a commutator and short-circuiting brushes, a source of alternating current, means for connecting said source to said primary member to produce a magnetization thereof on a line displaced from the line of said brushes, means for disconnecting said primary member from said source and short-circuiting said primary member on a line displaced in the other direction from the line of said brushes, and means for controlling the amount of current flow in the short-circuit.

10. In combination, a repulsion motor, a source of current therefor, and means for disconnecting said motor from said source and short-circuiting the primary member of said motor, with a relative displacement of the line of the commutator brushes and the line of the short-circuit of the primary member opposite to the relative displacement of the line of the commutator brushes and the line of magnetization of the primary member when connected to the source.

11. In combination, a repulsion motor, a source of current therefor, means for disconnecting said motor from said source and short-circuiting the primary member of said motor, with a relative displacement of the line of the commutator brushes and the line of the short-circuit of the primary member opposite to the relative displacement of the line of the commutator brushes and the line of magnetization of the primary member when connected to the source, and means for controlling the amount of current flow in the short-circuit.

12. The method of braking an alternating current motor having a rotor provided with a commutator and short-circuiting brushes, which consists in disconnecting the motor from the source, and connecting the motor for rotation in the opposite direction with its terminals short-circuited.

13. The method of braking an alternating-current motor having a rotor provided with a commutator and short-circuiting brushes, which consists in disconnecting the motor from the source, and connecting the motor for rotation in the opposite direction with its terminals short-circuited and controlling the current in the short-circuit.

14. The method of braking a repulsion motor which consists in disconnecting said motor from its source of supply and short-circuiting the primary member of said motor, with a relative displacement of the line of the commutator brushes and the line of the short-circuit of the primary member opposite to the relative displacement of the line of the commutator brushes and the line of magnetization of the primary member when connected to the source.

15. The method of braking a repulsion motor which consists in disconnecting said motor from its source of supply, short-circuiting the primary member of said motor with a relative displacement of the line of the commutator brushes and the line of the short-circuited primary opposite to the relative displacement of the line of the commutator brushes and the line of magnetization of the primary member when connected to the source, and controlling the amount of current flow in the short-circuit.

16. The method of controlling a repulsion motor having two sets of terminals for forward and reverse rotation respectively, which consists in disconnecting from the source of supply the set of terminals connected thereto and short-circuiting the other set.

17. The method of controlling a repulsion motor having two sets of terminals for forward and reverse rotation respectively, which consists in disconnecting from the source of supply the set of terminals connected thereto, short-circuiting the other set, and controlling the amount of current flow through the short-circuit.

In witness whereof, I have hereunto set my hand this 21st day of December, 1903.

MAURICE MILCH.

Witnesses:
BENJAMIN B. HULL,
HELEN ORFORD.